United States Patent [19]

Ishiwata et al.

[11] Patent Number: 4,953,959
[45] Date of Patent: Sep. 4, 1990

[54] OBJECTIVE LENS FOR OPTICAL DISKS

[75] Inventors: Hiroshi Ishiwata, Yokosuka; Tetsuo Ikegame; Ichiro Ikari, both of Hachiouji, all of Japan

[73] Assignee: Olympus Optical Co., Ltd., Tokyo, Japan

[21] Appl. No.: 348,680

[22] Filed: May 8, 1989

[30] Foreign Application Priority Data

May 12, 1988 [JP] Japan .................. 63-115172

[51] Int. Cl.$^5$ ............................................. G02B 13/18
[52] U.S. Cl. ................................................... 350/432
[58] Field of Search .......................................... 350/432

[56] References Cited

U.S. PATENT DOCUMENTS 4,595,264  6/1986  Nakamura .
4,613,212  9/1986  Norikazu .
4,657,352  4/1987  Suda et al. .
4,767,202  8/1988  Hata et al. .................. 350/432

FOREIGN PATENT DOCUMENTS 57-76512  5/1982  Japan .
59-49512  3/1984  Japan .
61-88213  6/1986  Japan .
61-136329  8/1986  Japan .
63-10118  1/1988  Japan .

Primary Examiner—Bruce Y. Arnold
Assistant Examiner—Rebecca D. Gass
Attorney, Agent, or Firm—Cushman, Darby & Cushman

[57] ABSTRACT

An objective lens for optical disks comprises a first lens component and a second lens component and, when the distance on an optical axis from an entrance face of the first lens component disposed in a position farthest from an optical disk to the center of gravity of the objective lens is taken as gc, the overall length of the objective lens as $\Sigma d$, and the focal length as f, the following conditions are satisifed and any of surfaces of the lens components is configured as an aspherical surface:

$$g c < \Sigma d < 0.5$$

$$0.9 < \Sigma d / f < 2.2$$

Thus, the use of the objective lens makes it possible to reduce the load to a driving device for moving the objective lens and to provide the driving device small in size and light in weight.

8 Claims, 9 Drawing Sheets

OBJECTIVE LENS FOR OPTICAL DISKS

BACKGROUND OF THE INVENTION (a) Field of the Invention

The present invention relates to an objective lens unit favorable for the use of an optical pickup device incorporated in an optical information recording/reproducing apparatus for recording information in optical information recording media such as optical disks and optical cards or for reproducing the information recorded in such information recording media.

(b) Description of the Prior Art

In order to correctly record or reproduce information, an optical information recording/reproducing apparatus needs to be controlled so that a light spot can exactly follow an information track on an information recording medium. For this reason, an objective lens system is movably supported in a focusing direction parallel with its optical axis and a tracking direction transverse thereto so that the position of the lens system is shifted in both the directions by an electromagnetic driving device.

To facilitate such control, it is desired that the objective lens system is compact and light in weight, and recently in particular, this demand has been remarkably increased in accordance with the compaction of the optical information recording/reproducing apparatus. This is because, if the objective lens system which is compact and light in weight is employed, the electromagnetic driving device controlling the lens system can also be used as a small-sized one and as such extreme compaction of an optical pickup device is brought about. As a result, the reduction of the number of lenses constituting the objective lens system is rapidly made and, at last, an objective lens system comprising a single aspherical lens has been realized.

However, problems have been encountered that the single lens is not necessarily lightest in weight in view of the materials and thickness of the lens and is rather heavier in particular consideration of the electromagnetic driving device in addition thereto. This respect will be described in detail below.

FIGS. 1A and 1B show an example of an objective driving device used for conventional optical pickup devices. In these figures, an objective lens system 1 is fixed to a lens holder 2A molded integral with a plastic moving member 2. The moving member 2 possesses a frame 2B rectangular in cross section in such a manner as to surround the lens holder 2A and sets the lens holder 2A upright from the bottom wall of the frame 2B. Further, on the outside of the frame 2B are constructed walls 2F and 2G for forming openings 2D and 2E into which inner yokes described later are inserted. Moreover, supporting portions 2H-2K supporting resilient supporting members 3A-3D are formed respectively on the side walls facing to each other (however, reference numerals 2K and 3D are not shown). On the periphery of the frame 2B are secured tracking coils 4A, 4B and a focusing coil 5 for generating electromagnetic driving power in the tracking and forcusing directions, respectively. The moving member 2 is constructed in this way and connected to a stationary member 6 through the resilient supporting members 3A-3D so as to be displaceable in the focusing and tracking directions.

The stationary member 6 is provided with a base 7A and outer yokes 7B, 7C made from a magnetic material, inner yokes 8A, 8B formed likewise from the magnetic material, permanent magnets 9A, 9B, and a supporting plate 10. The outer yokes 7B, 7C are constructed by being vertically bent from the base 7A to secure the permanent magnets 9A, 9B on the inside thereof, respectively. The supporting plate 10 is secured by a screw 12 on the outside of the outer yoke 7C. On the opposite sides of the supporting plate 10 are formed grooves 10A-10D into which the end portions of the resilient supporting member 3A-3D are fitted.

On the other hand, a circular projecting portion is provided at the center of the base 7A, through which an opening 7Q for an optical path of the objective lens system 1 is bored. Also, the inner yokes 8A, 8B are constructed integral with a disk 11 made from the magnetic material having an opening corresponding to the opening 7Q.

The stationary member 6 is constructed as stated above and is such that the one inner yoke 8A is inserted into the opening 2D of the moving member 2 and the other inner yoke 8B into the opening 2E to configure a first magnetic circuit in which a magnetic flux traverses a vertical guide for the tracking coil 4A and the focusing coil 5 by the base 7A, outer yoke 7B, permanent magnet 9A, and inner yoke 8A and a second magnetic circuit in which the magnetic flux traverses likewise a vertical guide for the tracking coil 4B and the focusing coil 5 by the base 7A, outer yoke 7C, permanent magnet 9B, and inner yoke 8B.

Now, when an electric current flows through the tracking coils 4A, 4B and the focusing coil 5, these coils are shifted in the tracking and focusing directions by a so-called Lorentz force so that the position control of the objective lens system is performed.

In the case where the objective lens system comprising a single lens is attached to such an objective lens driving device, difficulties have arisen that the weight balance of the moving member 2 is lost to cause a rolling phenomenon and, as a result, complete performance of the objective lens system cannot be exerted. FIG. 2 is a view showing schematically a state of mounting of the objective lens system to the lens holder 2A. In order to maintain a space (working distance) between the objective lens system and the information recording medium, not shown, located at the upper portion of the figure, the objective lens system 1 needs to be attached to the upper end of the lens holder 2. Consequently, even though the driving center in tracking drive coincides with the center of gravity c of the moving member 2, the center of gravity compounded of the moving member 2 and the objective lens system 1 fails to coincide with the driving center because the center of gravity gc does not coincide with the driving center, and the moving member 2, which does not move in parallel when a driving force is applied, causes the lens holder 2A to move in such a manner as to shake its head. Some provision for preventing this defect is that a balancer 20 is provided on the lower side of the moving member to correct the unbalance of weight which is attributable to the mounting of the objective lens system 1. This, however, results in increased weight of the moving member 2 and a heavy loss of the effect that the number of lenses constituting the objective lens system has been reduced. Moreover, since a glass material with considerably high refractive index is employed for the single objective lens from the necessity of aberration correction and is relatively heavy for one lens, total weight extremely increases when the balancer is further added, and an excessive load occurs in the driving device. This matter will be explained by the following concrete example.

FIG. 3 is a view for explaining detailedly the position of the center of gravity of the moving member 2 shown in FIG. 2. Now, considering such an objective lens as proposed in the eighth embodiment of Japanese Patent Preliminary Publication No. Sho 61-88213 as the objective lens system 1, when the outer diameter of the lens is 5 mm$\phi$ and the materials are LASF 08, the weight of the lens is 360 mg and the center of gravity gc is positioned at a distance of 2.08 mm from a first surface of the lens. On the other hand, the height of the lens holder is assumed to be 6 mm in dimension and the center of gravity c of the moving member 2 to be positioned at a distance of 2.75 mm from the lower surface thereof.

In the case where the objective lens system 1 is attached to the top of the lens holder 2A, the weight of the balancer 20 necessary for the coincidence in position between the center of gravity gc of the objective lens system 1 and the center of gravity c of the moving member 2 is 253 mg ($=1.58\times360/2.25$) and the total weight of the objective lens system 1 and the balancer 20 is as heavy as 613 mg. Since the acceleration at which the moving memer of the objective lens driving device is driven is proportional to the weight of the moving member, the objective lens system and the balancer having a weight of more than 600 mg in total renders the moving member heavy to reduce the acceleration available or to need an energetic driving system for securing similar acceleration, with the result that many problems will be encountered such as the reduction of performance, raise of cost, and large-sized structure.

As depicted in FIG. 4 for another provision, it is considered that the moving member per se is made thinner to minimize the deviation in position of the center of gravity between the objective lens system and the moving member. This design, however, will create new difficulties such that, since a distance d between two resilient supporting members 3A, 3B turns extremely short, torsional rigidity decreases and the driving force weakens with the reduction of driving sensitivity because the coil attachable to the moving member is inevitably made small.

If the objective lens system is composed of two lenses, the unbalance of weight distribution can be avoided in some extent. Although the objective lens system for optical disks comprising two single lenses is known from Japanese Patent Preliminary Publication No. Sho 59-49512, the objective lens system designed in consideration of the weight distribution of the driving device has never been proposed in the past. That is, the lens system of Sho 59-49512 is composed of two lens components and two lens elements with a view to making aberration correction, is not intended for two-lens-component structure to make the center of gravity of the lens system approach toward that of the holder, and needs the balancer. Further, power distribution of a first lens is large and the necessity of a long focal distance for maintaining a working distance makes it difficult to prepare a compact and lightweight design.

Although Japanese Patent Preliminary Publication No. Sho 63-10118 also provides the lens system of the two-lens-component structure, it is adapted to correct chromatic aberration, using the lenses that $\Sigma d/f$ is large and weight is heavy. In addition, since all of astigmatism, spherical aberration and sine condition are forcedly corrected in the lens system, an aspherical surface assumes a complicated configuration, which has an inflection point.

As a result, workability is considerably lowered.

When the focal length of, for example, Embodiment 4 of Sho 63-10118 is proportionally increased to $f=4.3$, the values of a lens weight mc and a working distance WD are as follows:

mc=676 mg, WD=1.35

These values, however, indicate that the lens system is unsuitable for the objective lens for optical memories.

The grounds for $f=4.3$ are that the best imaging performance has been brought about when a disk thickness is taken as 1.2. Also, speaking of the lens weight, the outer diameter of a first lens component is taken as $\phi5.2$ and a second lens component as $\phi4.6$, and working glass materials are SFL 03, LaK 18, and SK 5 whose specific gravities are used.

SUMMARY OF THE INVENTION

An object of the present invention is to provide an objective lens for optical disks in which the positional deviation in center of gravity between the moving member and the objective lens unit can be minimized without addition of any balancer and thereby a load to the driving device can be reduced.

Another object of the present invention is to provide the objective lens for optical disks in which the driving device can be constructed to be compact and light in weight.

These objects are accomplished, according to the present invention, by the lens configuration that the objective lens for optical disks is provided with at least two lens components and, when the value measured along an optical axis with respect to the distance from the entrance face of a first lens component, out of the two lens components, provided in the position farthest from the information recording medium such as the optical disk to the center of gravity of the entire objective lens unit is taken as gc, the overall length of the objective lens unit, that is, the distance from the entrance face of the first lens component to the surface, nearest to the information recording medium, of a lens component provided in the position nearest to the information recording medium as $\Sigma d$, and the focal length of the objective lens as f, the conditions $$gc/\Sigma d<0.5 \qquad (1)$$

$$0.9<\Sigma d/f<2.2 \qquad (2)$$

are satisfied and any of the lens surfaces is formed as an aspherical surface.

According to the present invention, if the position of the center of gravity of the objective lens unit per se is lowered and the overall length thereof is moderately set, the center of gravity of the objective lens unit can be made close to that of the moving member without need of a large balancer when the objective lens unit is attached to the lens holder of the objective lens driving device. Consequently, the moving member, which can be made lightweight without causing the rolling phenomenon, allows the compaction of the entire objective lens driving device.

According to a preferred formation of the present invention, an aspherical surface provided in the objective lens unit makes it possible to make sufficient aberration correction even if lens materials with relatively low refractive indices are combined with plural lenses for use, so that the objective lens unit per se can be made lightweight to be further favorable for the compaction of the objective lens driving device. Moreover, a second lens component adjacent to the first lens component across an airspace is configured as a lens component having positive refracting power like the first lens component and, when the focal length, the refractive index, and the radius of curvature of the surface, nearest to the first lens component, of the second lens component are taken as $f_2$, $n_2$, and $r_3$, respectively, the conditions $$0.8 < f/f_2 < 1.1 \qquad (3)$$

$$0.7 < (n_2-1)f/r_3 < 1.1 \qquad (4)$$

are satisfied, with the fact that if the surface, nearest to the first lens component, of the second lens component assumes the aspherical surface, the objective lens unit in which the aberration correction has further favorably been made is available.

Here, the significance of each condition is explained.

Condition (1) is intended to make the center of gravity of the moving member coincident with that of the objective lens unit as mentioned above. As such, if $gc/\Sigma d > 0.5$, the balancer is required since the center of gravity of the objective lens system is positioned in an excessively upper portion. This is undesirable in view of various points such as high costs and increase of working time for the assembly of the objective lens driving device which are attributable to the increase of the number of parts as well as the increase of weight of the moving member. If an attempt is made to solve the difficulty without use of the balancer, it follows from this that the attempt inevitably depends upon the same way as in the explanation relative to FIG. 4 and causes the same defects as therein.

Condition (2) is to determine the overall length of the objective lens unit so that the objective lens driving device is made compact and light in weight and the reduction of the driving sensitivity is prevented. If $\Sigma d/f > 2.2$, the moving member mounting the objective lens unit becomes large and as such increased thickness of the driving device will defeat the intention of the compaction, though a large-sized coil can be used which is advantageous to the improvement of the driving sensitivity. On the other hand, where $\Sigma d/f < 0.9$, this condition, though favorable for the compaction, undesirably brings about the reduction of the driving sensitivity and the decrease of the torsional rigidity for the same reasons as in the explanation relative to FIG. 4. In order to maintain the working distance, the condition of $4.0 \leq f$ is required, while on the other hand, the condition for making the lens compact is desirable to be $f \leq 4.6$, the prevention of reduction in the driving sensitivity of the driving device and the enhancement of the torsional rigidity need to be $4 \leq \Sigma d$, and the compaction of the device is desirable to be $\Sigma d \leq 10$. Accordingly, the range of condition (2) is suitable.

Conditions (3) and (4) are provided for the purpose of correcting various aberrations. That is, if condition (3) turns to $f/f_2 > 1.1$, it is difficult that spherical aberration and sine condition are corrected at the same time only by the aspherical surface of the second lens component, provided at the surface on the side of the first lens component. Further, if $f/f_2 < 0.8$, strong refracting power of the first lens component reduces the ratio of the working distance to the focal length of the entire system. As a result, the focal length of the entire system is inevitably extended in order to hold a necessary working distance, which blocks the compaction of the objective lens unit.

If $(n_2-1)f/r_3 > 1.1$ after condition (3) is satisfied, the refracting power is biased onto the aspherical surface of the second lens component, provided on the side of the first lens component, and consequently, though such bias is advantageous to the correction of the spherical aberration and the sine condition, it becomes impossible that astigmatism generated in the second lens component is corrected by the first lens component, which deteriorates off-axis performance. Furthermore, if $(n_2-1)f/r_3 < 0.7$, this condition, though favorable for the correction of the astigmatism, renders the correction of the sine condition difficult and brings about remarkable deterioration in off-axis performance with comatic aberration. Also, if an attempt is forcedly made to correct the sine condition, the aspherical surface needs the configuration with the inflection point and thus workability is considerably diminished.

These and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1A:
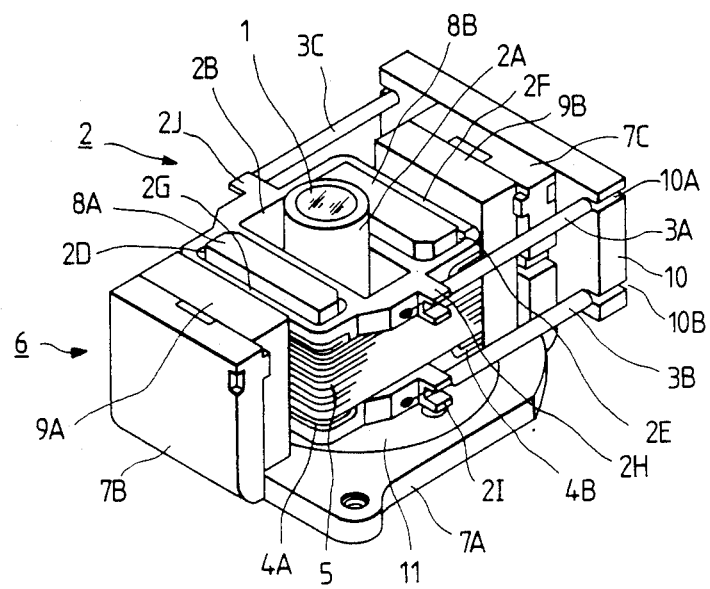
FIGS. 1 to 4 are views for explaining structure and defects of an example of driving devices of conventional objective lenses for optical disks.
Figure 1B:
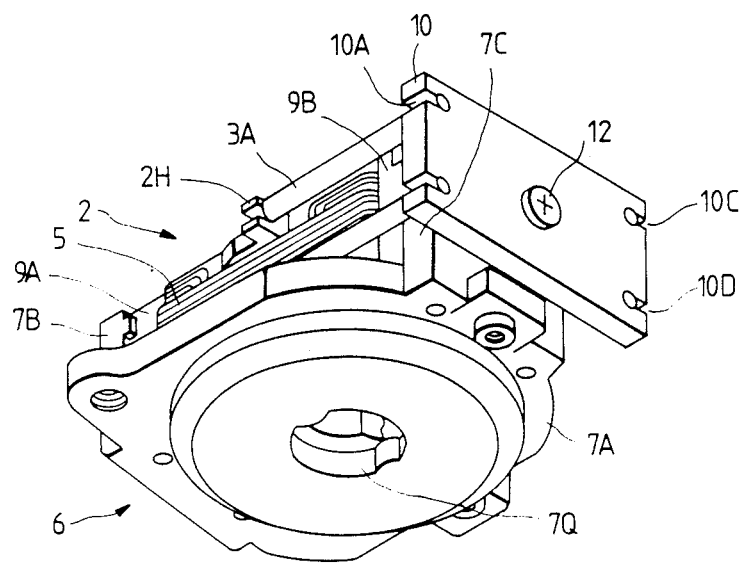

The embodiments of the present invention are shown below. The objective lens unit of each embodiment is comprised of two lens groups, in which reference symbols $r_1$, $r_2$, ... represent the radii of curvature of respective lens surfaces; $d_1$, $d_2$, ... the spaces between the respective lens surfaces; $n_1$, $n_2$, ... the refractive indices of respective lenses; NA the numerical aperture; and WD the working distance. Further, reference symbol $f_2$ designates the focal length of a second lens component and f the focal length of the entire lens system.

When the optical axis is taken as the x axis and the axis of ordinate transverse thereto as the y axis, the aspherical surface used in each embodiment is expressed by the formula $$x = \frac{y^2/r}{1 + \sqrt{1 - p(y/r)^2}} + \sum_{i=2}^{n} A_{2i} y^{2i}$$

where r is the radius of curvature of a circle contacting with the aspherical surface on the optical axis, p the conical constant, and $A_{2i}$ the aspherical coefficient of 2i order. Also, like reference numerals and symbols are used to the members having like functions with conventional examples and, in such a case, a detailed explanation is omitted.

EMBODIMENT 1

Figure 5:
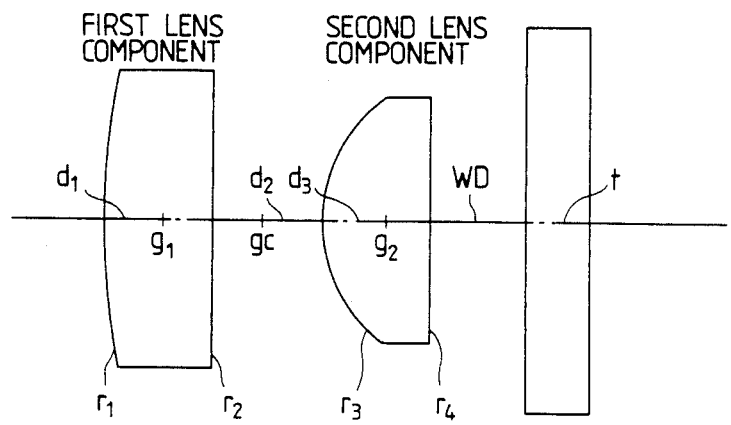
FIGS. 5 to 7 are views showing Embodiment 1 of the present invention.
Figure 6:
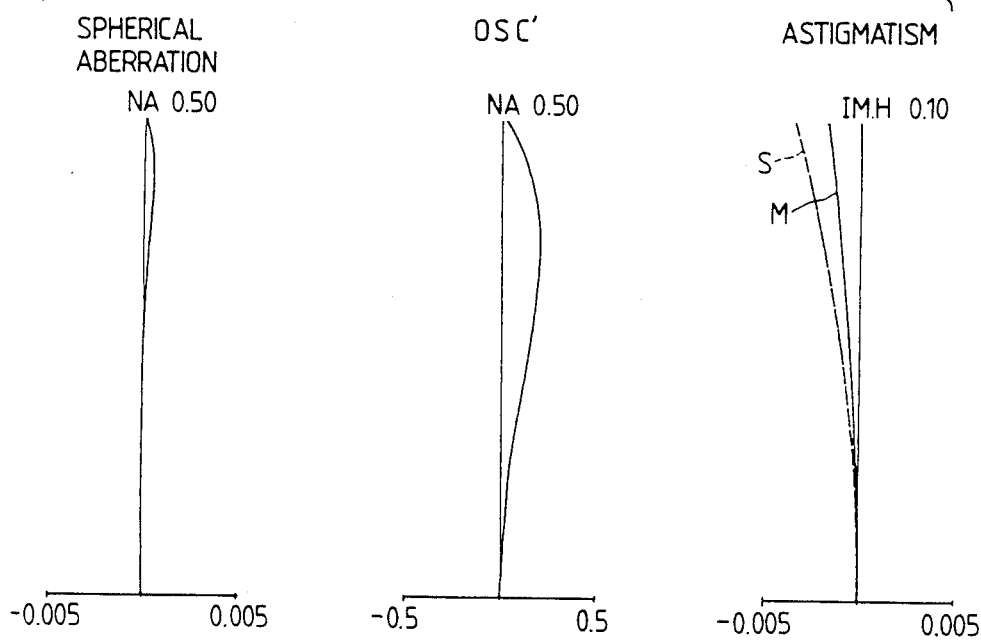

FIG. 5 is a sectional view of the objective lens unit according to Embodiment 1 of the present invention and FIG. 6 is aberration curve diagrams thereof. Numerical data for lenses are as follows:

| | | |
|---|---|---|
| $r_1 = 14.2554$ | | |
| $d_1 = 2.0$ | | $n_1 = 1.51072$ (BK 7) |
| $r_2 = \infty$ | | |
| $d_2 = 2.0$ | | |
| $r_3 = 2.5621$ | (aspherical surface) | |
| $d_3 = 2.0$ | | $n_2 = 1.57219$ (LF 5) |
| $r_4 = \infty$ | | |
| $p = 0.5639$ | | |
| $A_4 = 0.32834 \times 10^{-3}$, | $A_6 = -0.19364 \times 10^{-4}$, | |
| $A_8 = -0.59579 \times 10^{-5}$, | $A_{10} = -0.57051 \times 10^{-6}$, | |
| $t = 1.2$, $n_c = 1.553$, | $f = 4.3$, NA $= 0.5$, | |
| WD $= 1.743$, $f/f_2 = 0.9606$, | $(n_2 - 1)f/r_3 = 0.9603$ | | where a working reference wavelength is 780 nm. In this embodiment, the glass material of a first lens component is taken as BK 7 (specific gravity $P_1=2.52$) and that of a second lens component as LF 5 (specific gravity $P_2=3.23$). From this, weights $M_1$, $M_2$, M and positions of the centers of gravity $g_1$, $g_2$, $g_e$ of respective lens components and the entire objective lens system are determined, as first and second lens component diameters $D_1=5.0$ mm and $D_2=4.4$ mm, as follows:

| |
|---|
| $M_1 = 94$ mg, $M_2 = 72$ mg, $M = 166$ mg, $g_1 = 1.05$, $g_2 = 5.23$, gc $= 2.87$ (gc/$\Sigma$d $= 0.478$) |

Figure 3:
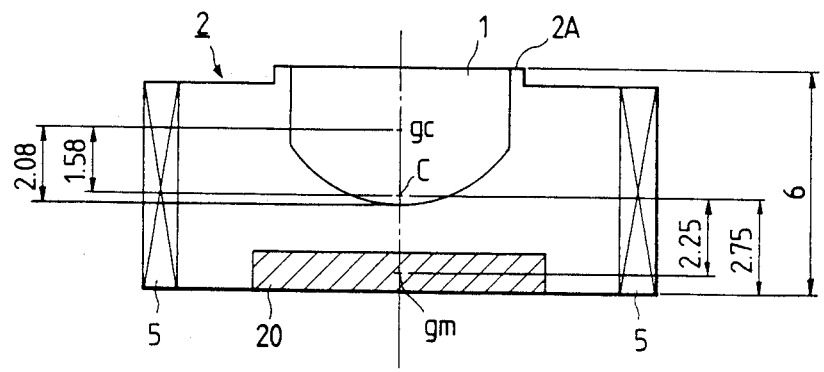
Figure 2:
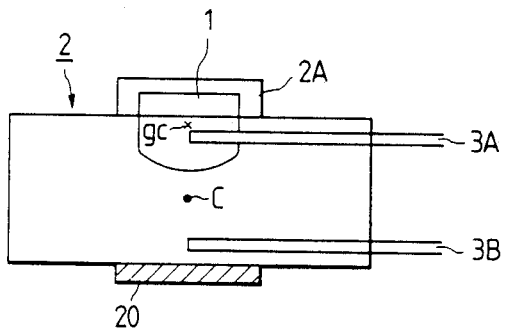
Figure 4:
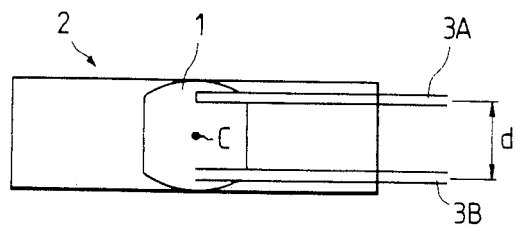
Figure 7:
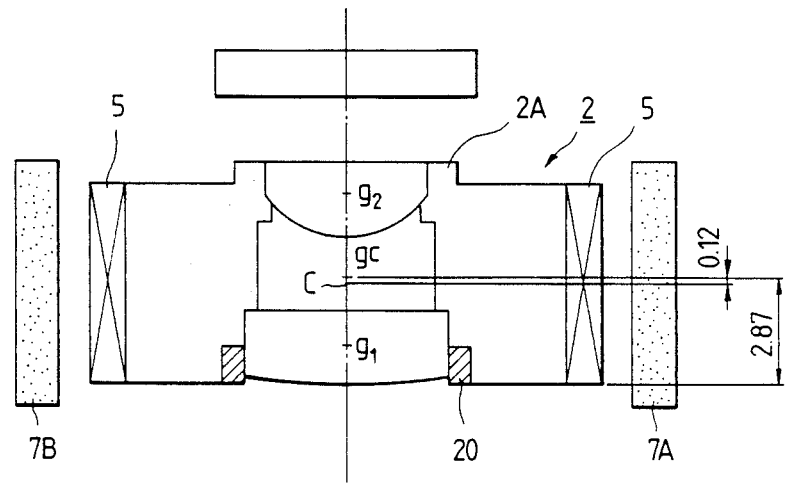

FIG. 7 is a sectional view showing schematically the state that the objective lens unit is mounted to the lens holder 2A. The size of the moving member is substantially the same as the conventional example depicted in FIG. 3. When the second lens component is mounted so that its disk side is virtually flush with the top face of the lens holder 2A, the center of gravity gc of the objective lens unit is positioned upward by 0.12 mm with respect to the center of gravity c of the moving member 2. Although, for this reason, an attempt is made so that the centers of gravity c and gc coincide with each other in virtue of the mounting of the balancer, the distance between the centers of gravity c and gc is very slight and as such it is only necessary to provide the balancer 20 of 9 mg which is extremely light in weight on the lower side of the moving member 2. Therefore, the total weight of the objective lens unit and the balancer is 175 mg at most and considerable compaction can be materialized. Further, with the weight of such an extent, it is only necessary to increase somewhat the thickness of the lower portion of the lens holder 2A without using a separate balancer and the simplification of the assembly process of the objective lens driving device is also possible.

EMBODIMENT 2

Figure 8:
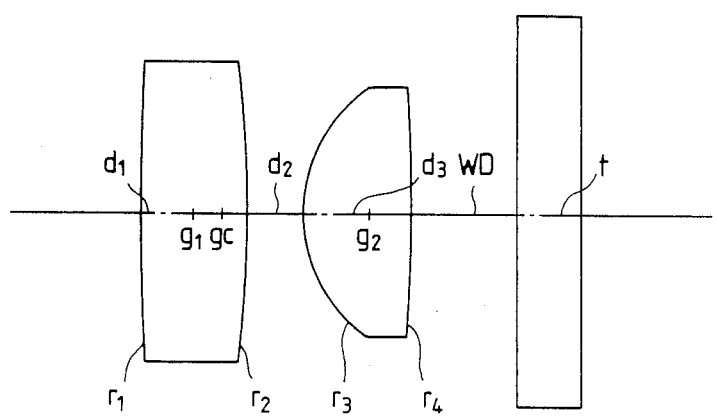
Figure 9:
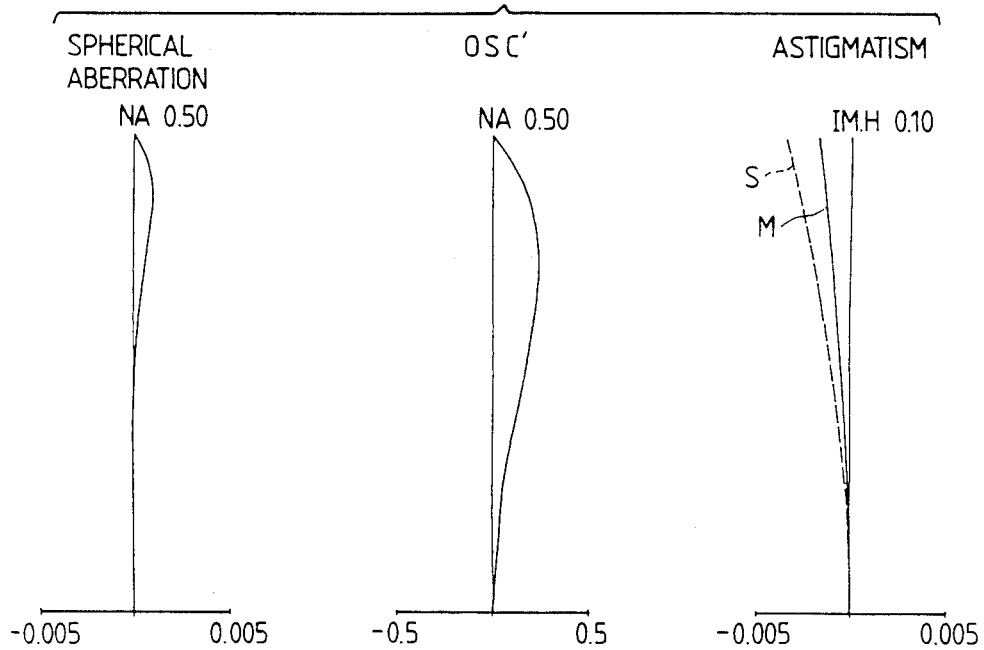

FIG. 8 is a sectional view of the objective lens unit according to Embodiment 2 of the present invention and FIG. 9 is aberration diagrams thereof. Numerical data for lenses are as follows:

| | | |
|---|---|---|
| $r_1 = 49.0882$ | | |
| $d_1 = 2.0$ | | $n_1 = 1.63552$ (SF 2) |
| $r_2 = -22.9313$ | | |
| $d_2 = 1.0$ | | |
| $r_3 = 2.4620$ | (aspherical surface) | |
| $d_3 = 2.0$ | | $n_2 = 1.48860$ (plastic) |
| $r_4 = -62.3391$ | | |
| $p = 0.5402$ | | |
| $A_4 = 0.38759 \times 10^{-3}$, | $A_6 = -0.16694 \times 10^{-4}$, | |
| $A_8 = -0.67438 \times 10^{-5}$, | $A_{10} = -0.72051 \times 10^{-6}$, | |
| $t = 1.2$, $n_c = 1.553$, | $f = 4.3$, NA $= 0.5$, | |
| WD $= 1.972$, $f/f_2 = 0.8780$, | $(n_2 - 1)f/r_3 = 0.8534$ | |

The glass material of the first lens component is SF 2 ($P_1=3.85$) and the material of the second lens component is plastic ($P_2=1.20$), having the diameters of $D_1=5.0$ mm and $D_2=4.5$ mm, respectively. Therefore,

| |
|---|
| $M_1 = 144$ mg, $M_2 = 26$ mg, $M = 170$ mg, $g_1 = 0.98$, $g_2 = 4.24$, gc $= 1.49$ (gc/$\Sigma$d $= 0.298$) |

Figure 10:
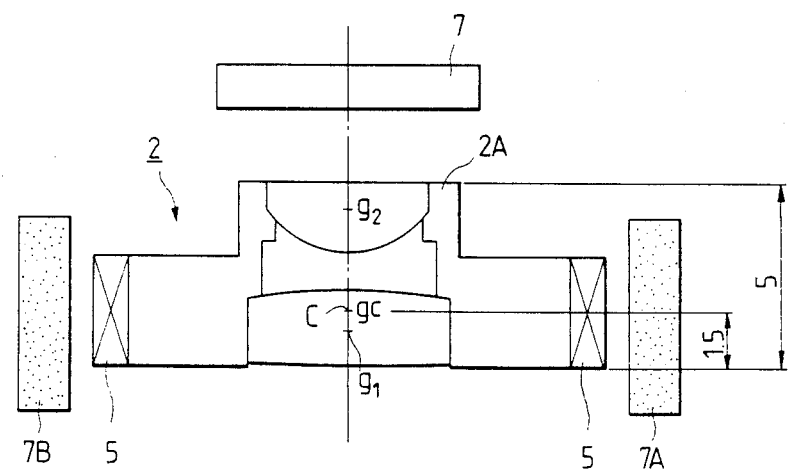
FIGS. 8 to 10 are views showing Embodiment 2 of the present invention.

FIG. 10 is a sectional view showing schematically the state that the objective lens unit is attached to the lens holder 2A. When the second lens component is mounted so that its disk side is virtually flush with the top face of the lens holder 2A, the difference in position between the center of gravity c of the moving member and the center of gravity gc of the objective lens unit is slightly 0.01 mm, which can practically be neglected. Hence the balancer is not entirely necessary and the entire device can remarkably be made light in weight.

Further, since the overall length of the objective lens unit is as short as $\Sigma d=5$ and as small as gc/$\Sigma$d $=0.293$, the height of the lens holder 2A can be made to diminish and, even though the thickness of the moving member is decreased to lower the position of the center of gravity, the entire device can be counterbalanced. As a result, since the distance from the top of the objective lens unit to the outer yokes 7A, 7B increases and the outer yokes 7A, 7B do not project into the disk side from the top of the objective lens unit even though the moving member 2 largely moves in a vertical direction, such a defect that a substantial working distance is diminished can be avoided.

Embodiment 3

Figure 11:
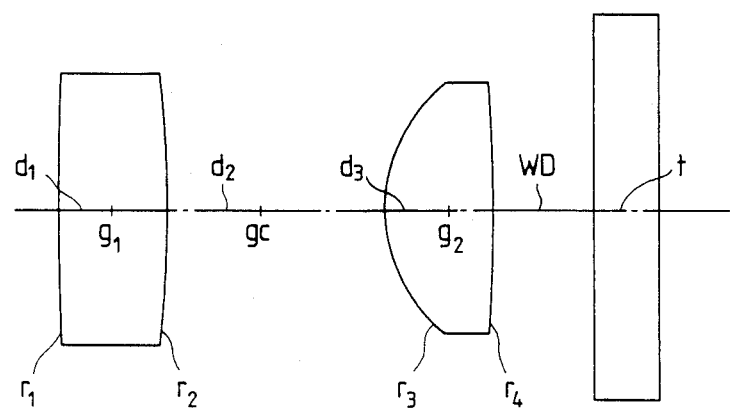
FIGS. 11 and 12 are views showing Embodiment 3 of the present invention.
Figure 12:
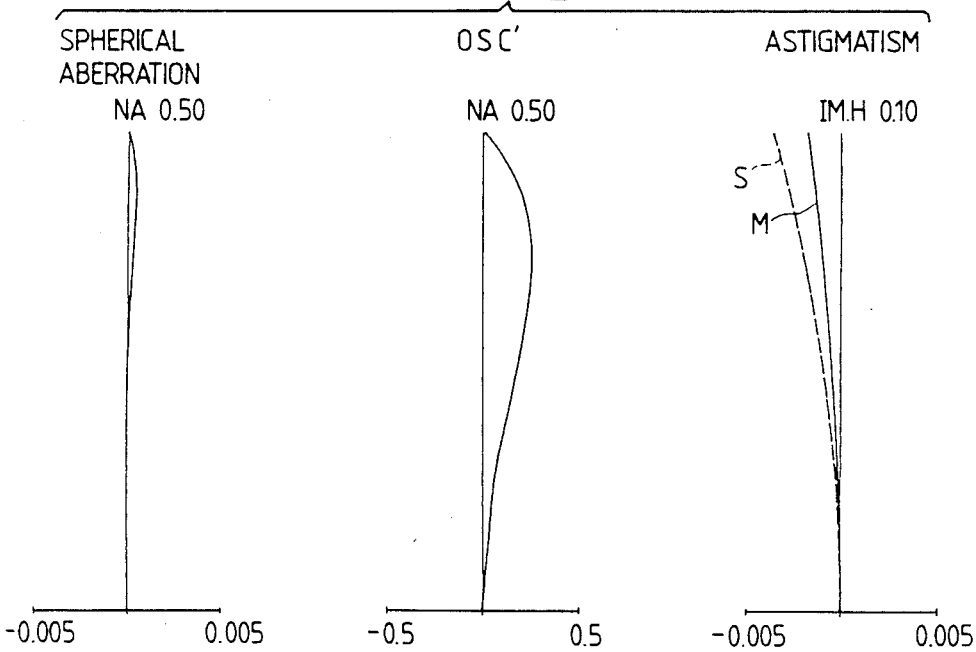

FIG. 11 is a sectional view of the objective lens unit according to Embodiment 3 of the present invention and FIG. 12 is aberration curve diagrams thereof. Numerical data for lenses are as follow:

| | | |
|---|---|---|
| $r_1 = 203.2358$ | | |
| $d_1 = 2.0$ | | $n_1 = 1.51072$ (BK 7) |
| $r_2 = -24.2958$ | | |
| $d_2 = 4.0$ | | |
| $r_3 = 2.5601$ | (aspherical surface) | |
| $d_3 = 2.0$ | | $n_2 = 1.57219$ (LF 5) |
| $r_4 = -48.2263$ | | |
| $p = 0.4547$ | | |
| $A_4 = 0.5651 \times 10^{-3}$, | $A_6 = -0.16865 \times 10^{-4}$, | |
| $A_8 = -0.59803 \times 10^{-5}$, | $A_{10} = -0.56439 \times 10^{-6}$, | |
| $t = 1.2$, $n_c = 1.553$, | $f = 4.3$, NA $= 0.5$, | |
| WD $= 1.877$, $f/f_2 = 0.998$, | $(n_2 - 1)f/r_3 = 0.9611$, | |
| $P_1 = 2.52$, $P_2 = 3.23$, | $D_1 = 5.0$, $D_2 = 4.5$, | |
| $M_1 = 96$ mg, $M_2 = 73$ mg, | $M = 169$ mg, $g_1 = 0.97$, | |
| $g_2 = 7.23$, gc $= 3.68$ (gc/$\Sigma$d $= 0.46$) | | |

EMBODIMENT 4

Figure 13:
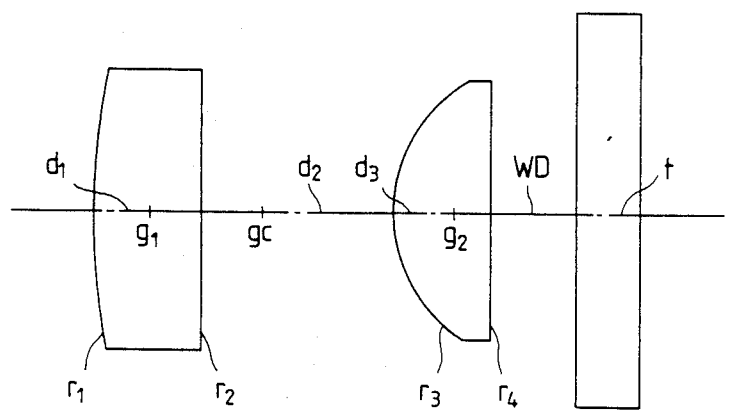
FIGS. 13 and 14 are views showing Embodiment 4 of the present invention.
Figure 14:
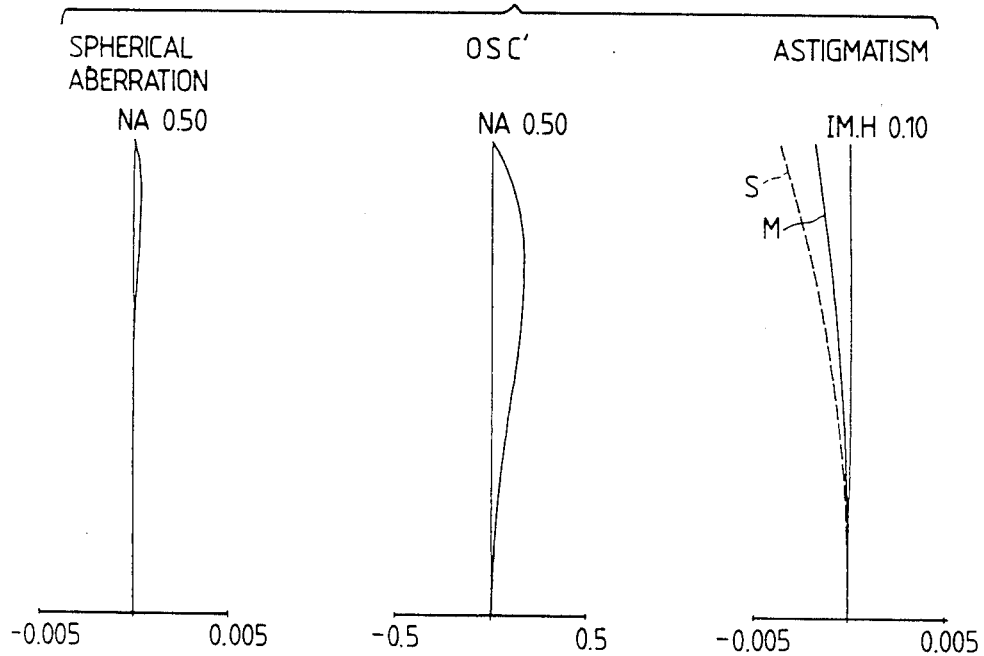

FIG. 13 is a sectional view of the objective lens unit according to Embodiment 4 of the present invention and FIG. 14 is aberration curve diagrams thereof. Numerical data for lenses are as follows:

---
$r_1 = 13.1873$
$d_1 = 2.0$     $n_1 = 1.51072$ (BK 7)
$r_2 = \infty$
$d_2 = 3.5$
$r_3 = 2.3682$   (aspherical surface)
$d_3 = 1.8$     $n_2 = 1.57219$ (LF 5)
$r_4 = 117.6595$
$p = 0.566$
$A_4 = 0.71285 \times 10^{-3}$,   $A_6 = -0.11175 \times 10^{-4}$,
$A_8 = -0.59809 \times 10^{-5}$,  $A_{10} = -0.57444 \times 10^{-6}$,
$t = 1.2$, $n_c = 1.553$,     $f = 4.3$, NA $= 0.5$,
WD $= 1.566$, $f/f_2 = 1.023$,   $(n_2 - 1)f/r_3 = 1.0389$,
$P_1 = 2.52$, $P_2 = 3.23$,    $D_1 = 5.0$, $D_2 = 4.0$,
$M_1 = 94$ mg, $M_2 = 55$ mg,   $M = 149$ mg, $g_1 = 1.06$,
$g_2 = 6.61$, gc $= 3.11$ (gc/$\Sigma$d $= 0.426$)
---

EMBODIMENT 5

Figure 15:
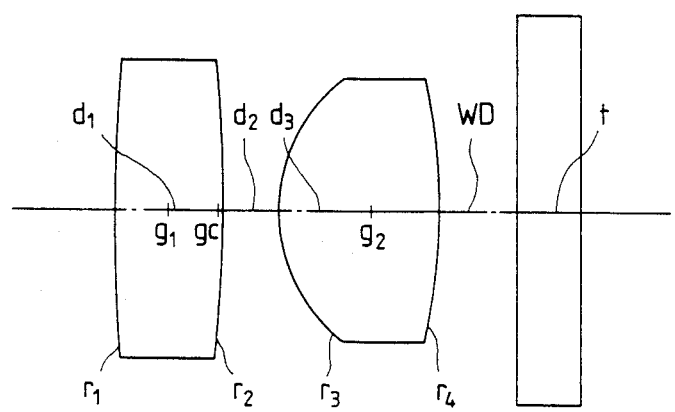
FIGS. 15 and 16 are views showing Embodiment 5 of the present invention.
Figure 16:
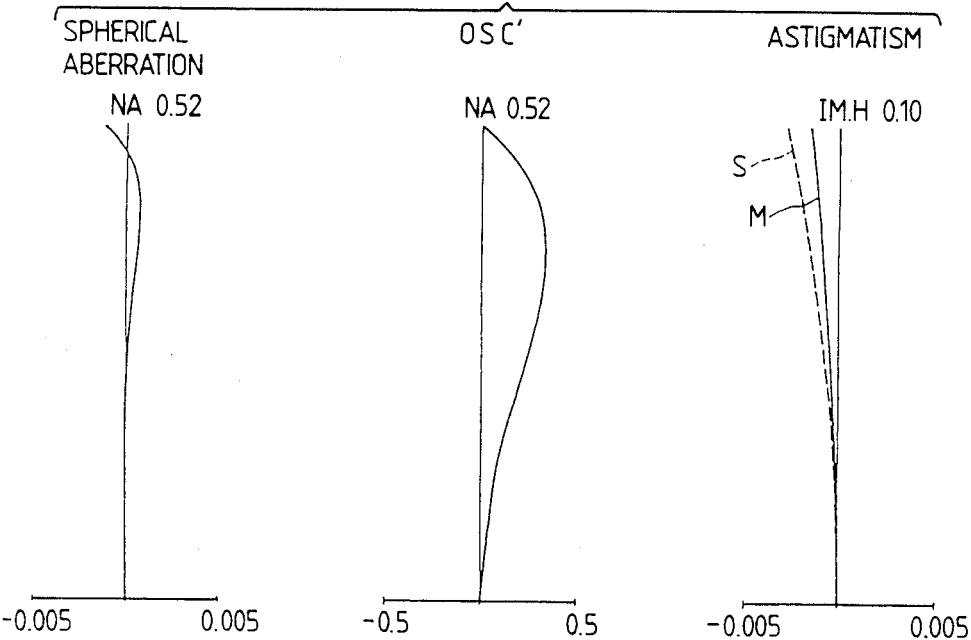

FIG. 15 is a sectional view of the objective lens unit according to Embodiment 5 of the present invention and FIG. 16 is aberration curve diagrams thereof. Numerical data for lenses are as follows ---
$r_1 = 30.4992$
$d_1 = 2.0$       $n_1 = 1.63552$ (SF 2)
$r_2 = -30.1925$
$d_2 = 1.0$
$r_3 = 2.6666$    (aspherical surface)
$d_3 = 3.0$       $n_2 = 1.48860$ (plastic)
$r_4 = -12.2051$
$p = 0.0031$
$A_4 = 0.35731 \times 10^{-2}$,   $A_6 = 0.63642 \times 10^{-4}$,
$A_8 = -0.67445 \times 10^{-5}$,  $A_{10} = -0.72051 \times 10^{-6}$,
$t = 1.2$, $n_c = 1.553$,      $f = 4.3$, NA $= 0.5$,
WD $= 1.40$, $f/f_2 = 0.896$,    $(n_2 - 1)f/r_3 = 0.7879$,
$P_1 = 3.85$, $P_2 = 1.20$,     $D = 5.0$, $D_2 = 4.5$,
$M_1 = 144$ mg, $M_2 = 45$ mg,   $M = 189$ mg, $g_1 = 1.00$,
$g_2 = 4.69$, gc $= 1.89$ (gc/$\Sigma$d $= 0.315$)
---

EMBODIMENT 6

Figure 17:
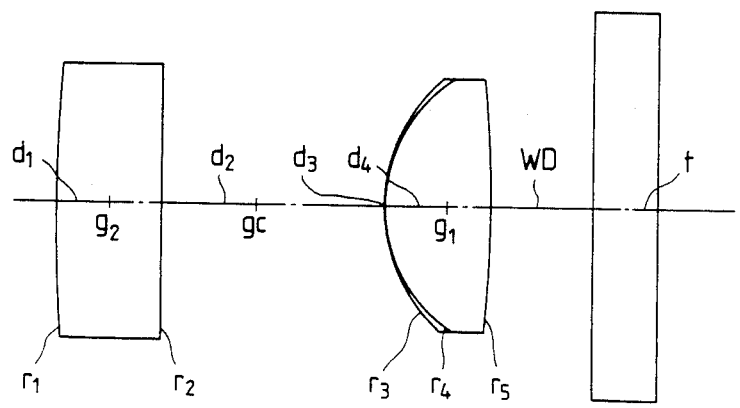
FIGS. 17 and 18 are views showing Embodiment 6 of the present invention.
Figure 18:
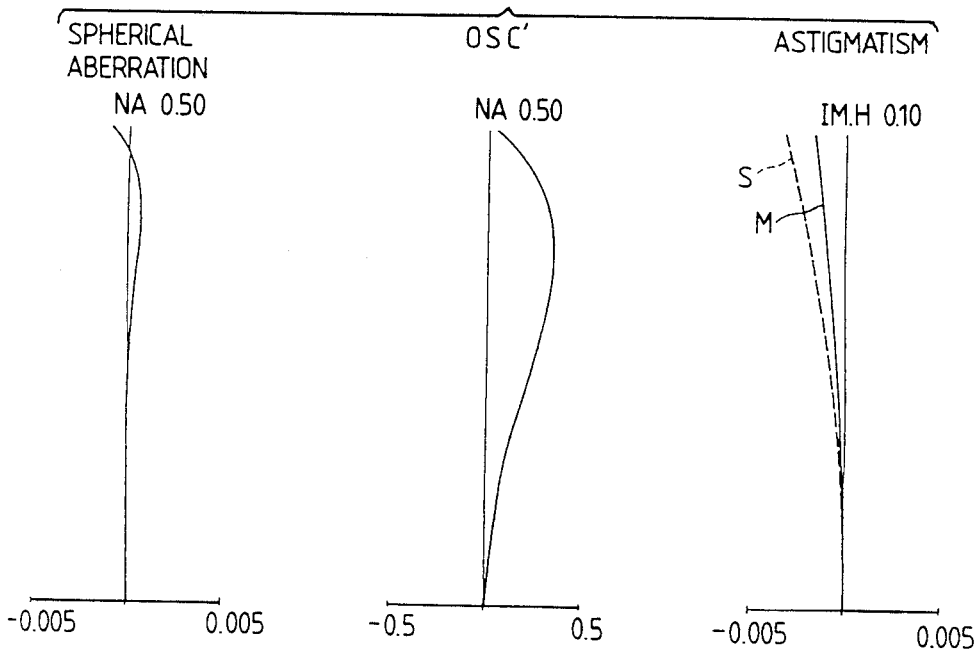

FIG. 17 is a sectional view of the objective lens unit according to Embodiment 6 of the present invention and FIG. 18 is aberration curve diagrams thereof. In this embodiment, the second lens component is comprised of a spherical lens and a thin plastic lens, having an aspherical configuration, cemented onto its surface. Numerical data for lenses are as follows:

---
$r_1 = 26.690$
$d_1 = 2.0$       $n_1 = 1.51072$ (BK 7)
$r_2 = \infty$
$d_2 = 4.0$
$r_3' = 2.5916$   (aspherical surface)
$d_3 = 0.03$      $n_2' = 1.48860$ (plastic)
$r_3 = 2.5916$
$d_4 = 2.0$       $n_2 = 1.57219$ (LF 5)
$r_4 = -23.5068$
$p = -0.370$
$A_4 = 0.54017 \times 10^{-2}$,   $A_6 = -0.10626 \times 10^{-3}$,
$A_8 = -0.11851 \times 10^{-4}$,  $A_{10} = -0.57061 \times 10^{-6}$,
$t = 1.2$, $n_c = 1.553$,      $f = 4.3$, NA $= 0.5$,
WD $= 1.887$, $f/f_2 = 1.025$,   $(n_2 - 1)f/r_3 = 0.9494$,
$P_1 = 2.52$, $P_2 = 3.23$,     $D_1 = 5.0$, $D_2 = 4.5$,
$M_1 = 97$ mg, $M_2 = 72$ mg,    $M = 169$ mg, $g_1 = 1.03$, -continued
$g_2 = 7.21$, gc $= 3.67$ (gc/$\Sigma$d $= 0.898$)
---

In Embodiment 6, the plastic layer of the second lens component is used only with a view to providing the aspherical surface and as such, where condition (4) is taken into consideration, the plastic layer may be neglected.

Although the weight of the objective lens unit is as extremely light as 200 mg or less in each embodiment, it is required that the total weight of the objective lens unit and the balancer does not exceed 500 mg to maintain favorably the driving sensitivity of the objective lens driving device.

What is claimed is:

1. An objective lens for optical disks comprising at least a first lens component provided in a position farthest from an information recording medium and a second lens component provided adjacent to said first lens component across an airspace for recording and/or reproducing information in regard to an information recording medium, wherein each of said first lens component and said second lens component has positive refractive power and, when the focal length of said objective lens is taken as f, the focal length and refractive index of said second lens component as $f_2$ and $n_2$, respectively, and the radius of curvature of a surface of said second lens component, nearest to said first lens component, as $r_3$, said objective lens satisfies the following conditions:

$$0.8 < f/f_2 < 1.1$$

$$0.7 < (n_2 - 1)f/r_3 < 1.1$$

and the surface of said second lens component, nearest to said first lens component, is configured as an aspherical surface.

2. An objective lens for optical disks according to claim 1, wherein, when the distance on an optical axis from an entrance face of said first lens component to a center of gravity of said objective lens is taken as gc, the overall length of the objective lens as $\Sigma d$, and the focal length as f, said objective lens satisfies that following conditions:

$$gc/\Sigma d < 0.5$$

$$0.9 < \Sigma d/f < 2.2$$

3. An objective lens for optical disks according to claim 1 or 2, wherein said objective lens has the following numerical data:

---
$r_1 = 14.2554$
$d_1 = 2.0$     $n_1 = 1.51072$   (BK 7: specific gravity 2.52)
$r_2 = \infty$
$d_2 = 2.0$
$r_3 = 2.5621$   (aspherical surface)
$d_3 = 2.0$     $n_2 = 1.57219$   (LF 5: specific gravity 3.23)
$r_4 = \infty$
$p = 0.5639$
$A_4 = 0.32834 \times 10^{-3}$,   $A_6 = -0.19364 \times 10^{-4}$,
$A_8 = -0.59579 \times 10^{-5}$,  $A_{10} = -0.57051 \times 10^{-6}$,
$t = 1.2$, $n_c = 1.553$,      $f = 4.3$, NA $= 0.5$,
WD $= 1.743$, $f/f_2 = 0.9606$,  $(n_2 - 1)f/r_3 = 0.9603$
---

$WD=1.743$, $f/f_2=0.9606$, $(n_2-1f/r_3=0.9603$ where $r_1$ to $r_4$ are the radii of curvature of respective lens surfaces, $d_1$ to $d_3$ are the spaces between respective lens surfaces, $n_1$ and $n_2$ are the refractive indices of respective lens components, p is the conical constant, $A_4$, $A_6$, $A_8$ and $A_{10}$ are the aspherical coefficients of 4, 6, 8 and 10 order, respectively, t is the thickness of an optical disk, $n_c$ is the refractive index of the optical disk, f is the focal length of the entire system, NA is the numerical aperture, WD is the working distance, and $f_2$ is the focal length of the second lens component.

4. An objective lens for optical disks according to claim 1 or 2, wherein said objective lens has the following numerical data:

| | | |
|---|---|---|
| $r_1 = 49.0882$ | | |
| $d_1 = 2.0$ | $n_1 = 1.63552$ | (SF 2: specific gravity 3.85) |
| $r_2 = -22.9313$ | | |
| $d_2 = 2.0$ | | |
| $r_3 = 2.4620$ | (aspherical surface) | |
| $d_3 = 2.0$ | $n_2 = 1.48860$ | (plastic: specific gravity 1.20) |
| $r_4 = -62.3391$ | | |
| $P = 0.5402$ | | |
| $A_4 = 0.38759 \times 10^{-3}$, | $A_6 = -0.16694 \times 10^{-4}$, | |
| $A_8 = -0.67438 \times 10^{-5}$, | $A_{10} = -0.72051 \times 10^{-6}$, | |
| $t = 1.2$, $n_c = 1.553$, | $f = 4.3$, $NA = 0.5$, | |
| $WD = 1.972$, $f/f_2 = 0.8780$, | $(n_2 - 1)f/r_3 = 0.8534$ | |

$WD=1.972$, $f/f_2=0.8780$, $(n_2-1)f/r_3=0.8780$, $(n_2-1)f/r_3=0.8534$ where $r_1$ to $r_4$ are the radii of curvature of respective lens surfaces, $d_1$ to $d_3$ are the spaces between respective lens surfaces, $n_1$ and $n_2$ are the refractive indices of respective lens components, p is the conical constant, $A_4$, $A_6$, $A_8$ and $A_{10}$ are the asprical coefficients of 4, 6, 8 and 10 order, respectively, t is the thickness of an optical disk, $n_c$ is the entire system, NA is the numerical aperture, WD is the working distance, and $f_2$ is the focal length of the second lens component.

5. An objective lens for optical disks according to claim 1 or 2 wherein said objective lens has the following numerical data:

| | | |
|---|---|---|
| $r_1 = 203.2358$ | | |
| $d_1 = 2.0$ | $n_1 = 1.51072$ | (BK 7: specific gravity 2.52) |
| $r_2 = -24.2958$ | | |
| $d_2 = 4.0$ | | |
| $r_3 = 2.5601$ | (aspherical surface) | |
| $d_3 = 2.0$ | $n_2 = 1.57219$ | (LF 5: specific gravity 3.23) |
| $r_4 = -48.2263$ | | |
| $p = 0.4547$ | | |
| $A_4 = 0.5651 \times 10^{-3}$, | $A_6 = -0.16865 \times 10^{-4}$, | |
| $A_8 = -0.59803 \times 10^{-5}$, | $A_{10} = -0.56439 \times 10^{-6}$, | |
| $t = 1.2$, $n_c = 1.553$, | $f = 4.3$, $NA = 0.5$, | |
| $WD = 1.877$, $f/f_2 = 0.998$, | $(n_2 - 1)f/r_3 = 0.9611$ | |

$WD=1.877$, $f/f_2=0.998$, $(n_2-1)f/f_3=0.9611$ where $r_1$ to $r_4$ are the radii of curvature of respective lens surfaces, $d_1$ to $d_3$ are the spaces between respective lens surfaces, $n_1$ and $n_2$ are the refractive indices of respective lens components, p is the conical constant, $A_4$, $A_6$, $A_8$ and $A_{10}$ are the asprical coefficients of 4, 6, 8 and 10 order, respectively, t is the thickness of an optical disk, $n_c$ is the refractive index of the optical disk, f is the focal length of entire system, NA is the numerical aperture, WD is the working distance, and $f_2$ is the focal length of the second lens component.

6. An objective lens for optical disks according to claim 1 or 2, where said objective lens has the following numerical datad

| | | |
|---|---|---|
| $r_1 = 13.1873$ | | |
| $d_1 = 2.0$ | $n_1 = 1.51072$ | (BK 7: specific gravity 2.52) |
| $r_2 = \infty$ | | |
| $d_2 = 3.5$ | | |
| $r_3 = 0\ 2.3682$ | (aspherical surface) | |
| $d_3 = 1.8$ | $n_2 = 1.57219$ | (LF 5: specific gravity 3.23) |
| $r_4 = 117.6595$ | | |
| $p = 0.566$ | | |
| $A_4 = 0.71285 \times 10^{-3}$, | $A_6 = 0.11175 \times 10^{-4}$, | |
| $A_8 = -0.59809 \times 10^{-5}$, | $A_{10} = -0.57444 \times 10^{-6}$, | |
| $t = 1.2$, $n_c = 1.553$, | $f = 4.3$, $NA = 0.5$, | |
| $WD = 1.566$, $f/f_2 = 1.023$, | $(n_2 - 1)f/r_3 = 1.0389$ | |

$WD=1.566$, $f/f_2=1.023$, $(n_2-1)f/r_3=1.0389$ where $r_1$ to $r_4$ are the radii of curvature of respective lens surfaces, $d_1$ to $d_3$ are the spaces between respective lens surfaces, $n_1$ and $n_2$ are the refractive indices of respective lens components, p is the conical constant, $A_4$, $A_6$, $A_8$ and $A_{10}$ are the aspherical coefficients of 4, 6, 8 and 10 order, respectively, t is the thicknesss of an optical disk, $n_c$ is the refractive index of the optical disk, f is the focla length of the entire system, NA is the numerical aperture, WD is the working distance, and $f_z$ is the focal length of the second lens component.

7. An objective lens for optical disks according to claim 1 or 2, wherein said objective lens has the following numerical data:

| | | |
|---|---|---|
| $r_1 = 30.4992$ | | |
| $d_1 = 2.0$ | $n_1 = 1.63552$ | (SF 2: specific gravity 3.85) |
| $r_2 = -30.1925$ | | |
| $d_2 = 1.0$ | | |
| $r_3 = 2.6666$ | (aspherical surface) | |
| $d_3 = 3.0$ | $n_2 = 1.48860$ | (plastic: specific gravity 1.20) |
| $r_4 = -12.2051$ | | |
| $p = 0.0031$ | | |
| $A_4 = 0.35731 \times 10^{-2}$, | $A_6 = -0.63642 \times 10^{-4}$, | |
| $A_8 = -0.67445 \times 10^{-5}$, | $A_{10} = -0.72051 \times 10^{-6}$, | |
| $t = 1.2$, $n_c = 1.553$, | $f = 4.3$, $NA = 0.5$, | |
| $WD = 1.40$, $f/f_2 = 0.896$, | $(n_2 - 1)f/r_3 = 0.7879$ | |

$WD=1.40 f/f_2=0.896$, $(n_2 0.896$, $(n_2-1)f/r_3=0.7879$ where $r_1$ to $r_4$ are the radii of curvature of respective lens surfaces, $d_1$ to $d_3$ are the spaces between respective lens surfaces, $n_1$ and $n_2$ are the refractive indices of respective lens components, p is the conical constant, $A_4$, $A_6$, $A_8$ and $A_{10}$ are the aspherical coefficients of 4, 6, 8 and 10 order, respectively, t is the thickness of an optical disk, $n_c$ is the refractive index of the optical disk, $n_c$ is the refractive index of the optical disk, f is the focal length of the entire system, NA is the numerical aperture, WD is the working distance, and $f_2$ is the focal length of the second lens component.

8. An objective lens for optical disks according to claim 1 or 2, wherein said objective lens has the following numerical data:

| |
|---|
| $r_1 = 26.690$ |

-continued

| | | |
|---|---|---|
| $d_1 = 2.0$ | $n_1 = 1.51072$ | (BK 7: specific gravity 2.52) |
| $r_2 = \infty$ | | |
| $d_2 = 4.0$ | | |
| $r_3' = 2.5916$ | (aspherical surface) | |
| $d_3 = 0.03$ | $n_2' = 1.48860$ | (plastic) |
| $r_3 = 2.5916$ | | |
| $d_4 = 2.0$ | $n_2 = 1.57219$ | (LF 5: specific gravity 3.23) |
| $r_4 = -23.5068$ | | |
| $p = -0.370$ | | |
| $A_4 = 0.54017 \times 10^{-2}$, | $A_6 = -0.10626 \times 10^{-3}$, | |
| $A_8 = -0.11851 \times 10^{-4}$, | $A_{10} = -0.57061 \times 10^{-6}$, | |
| $t = 1.2$, $n_c = 1.553$, | $f = 4.3$, $NA = 0.5$, | |

-continued $WD = 1.887$, $f/f_2 = 1.025$, $(n_2 - 1)f/r_3 = 0.9494$ $WD=1.887$, $f/f_2=1.025$, $(n_2-1)f/r_3=0.9494$ where $r_1$ to $r_4$ and $r_{3'}$ are the radii of curvature of rspective len surfaces, $d_1$ to $d_3$ are the spaces between respective lens surfaces, $n_1$, $n_2$ and $n_2'$ are the refractive indices of respective lens components, p is the conical constant, $A_4$, $A_6$, $A_8$ and $A_{10}$ *are the aspherical coefficients of* 4, 6, 8 and 10 order, respectively, t is the thickness of an optical disk, $n_c$ is the refractive index of the optical disk, f is the focal length of the entire system, NA is the numerical aperture, WD is the working distance, and $f_2$ is the focal length of the second lens component.

* * * * *